United States Patent

Evensen et al.

[19]

[11] Patent Number: 6,097,945
[45] Date of Patent: Aug. 1, 2000

[54] HANDLING OF TIME ZONES IN A TELECOMMUNICATION SYSTEM

[75] Inventors: Geir Evensen, Nedenäs; Paul Fjuk, Skjetten, both of Norway; Sören Wallinder, Haninge, Sweden

[73] Assignee: Telefonaktiebolaget LM Ericsson, Stockholm, Sweden

[21] Appl. No.: 09/239,699

[22] Filed: Jan. 29, 1999

Related U.S. Application Data

[63] Continuation of application No. PCT/SE97/01297, Jul. 18, 1997.

[30] Foreign Application Priority Data

Aug. 1, 1996 [SE] Sweden ................................... 9602908

[51] Int. Cl.$^7$ ................................................. H04Q 7/20
[52] U.S. Cl. ...................... 455/422; 455/432; 455/445; 455/435; 455/456
[58] Field of Search ..................... 455/422, 432, 455/435, 445, 458, 560, 188.1, 456; 368/21, 22, 4, 13, 47; 370/465, 252; 379/211, 220, 221

[56] References Cited

U.S. PATENT DOCUMENTS

| | | | |
|---|---|---|---|
| 5,818 | 10/1848 | Rignell et al. | 455/422 |
| 4,313,035 | 1/1982 | Jordan et al. | |
| 4,659,231 | 4/1987 | Barkouki | 368/15 |
| 4,979,118 | 12/1990 | Kheradpir | 370/54 |
| 5,329,578 | 7/1994 | Brennan et al. | 379/67 |
| 5,430,791 | 7/1995 | Feit et al. | 379/67 |
| 5,528,558 | 6/1996 | Mardhekar et al. | |
| 5,764,747 | 6/1998 | Yue et al. | 379/210 |
| 5,903,845 | 5/1999 | Buhrmann et al. | 379/210 |
| 5,905,958 | 10/1998 | Houde | 455/445 |

FOREIGN PATENT DOCUMENTS 2 263 845  8/1993  United Kingdom.

OTHER PUBLICATIONS

Wallinder, Sören, "Implementation of UPT–Universal Personal Telecommunication", Ericsson Review, No. 1, 1994.

Sundborg, Jonas, "Universal Personal Telecommunication (UPT)–Concept and Standardisation", Ericsson Review No. 4, 1993.

*Primary Examiner*—Daniel S. Hunter
*Assistant Examiner*—Yemane Woldetatios
*Attorney, Agent, or Firm*—Burns, Doane, Swecker & Mahtis, L.L.P.

[57] ABSTRACT

Time zones are handled in a telecommunication system with personal mobility and time dependent routing, particularly in a telecommunication system such as UPT (Universal Personal Telecommunication) system. The system is arranged to calculate the time difference between a time zone which is obtained from a subscriber, particularly a time zone where a subscriber permanently or temporarily is located, and a time where the routing takes place, particularly where a node is located, and to calculate the subscriber's current time by adding the time difference to the current time where the routing takes place. The time-dependent routing may include at least one time table for at least one subscriber. The time table includes at least two time periods for each time period. At least one terminal of function is defined to which the subscriber incoming traffic is intended to be routed. Corrections for daylight saving rules may be included. Menues for handling failed call setups and menues for callback are provided.

14 Claims, 2 Drawing Sheets

HANDLING OF TIME ZONES IN A TELECOMMUNICATION SYSTEM

This application is a continuation of PCT/SE97/01297 filed Jul. 18, 1997.

The present invention relates to a service for handling of timezones in a telecommunication system, particularly in a telecommunication system with personal mobility such as a system of UPT-type (Universal Personal Telecommunication).

BACKGROUND

Personal mobility means that a subscriber has a personal address or a personal number to which the subscription is linked and which address is completely independent of what terminal currently is meant to be used. The terminal can be connected in any network, e.g. the stationary public telecommunication network, a stationary private network or a cellular network. The network is assumed to have intelligence to be able to route traffic to/from the terminal and at the same time bill the subscription connected to the subscriber's address. This intelligence is often placed in a central node called service node. Examples of telecommunication systems with personal mobility are UPT (Universal Personal Telecommunication) and PCS (Personal Communications Services).

Routing of incoming traffic for terminals or for functions such as e.g. voice message, central message service or barring can be made time independent. The European Telecommunications Standards Institute ETSI calls this function within UPT 'Variable Routing'. It is implemented in an SCP (Service Control Point). A personal time table routing incoming traffic for different destinations depending on day of week and/or time of day can in this case be specified for each subscriber. The subscriber can also define alternative destinations to be used if, e.g., a call is not answered at the first destination.

If the subscriber, permanently or temporarily, is at a geografical location having a time zone which is different from that of the service node, especially the SCP, the time dependent routing of traffic can be wrong,. The subscriber wants to be able to specify the time table in local time.

Similar problems can arise for time dependent services in a corporate network, e.g. in a VPN (Virtual Private Network), extending over at least two time zones.

SUMMARY

The object of the present invention is to provide a time zone handling within a telecommunication system with time dependent routing, particularly in a system with personal mobility such as in a UPT system, correcting for the time difference between the time zone provided by a subscriber, particularly the time zone where a subscriber permanently or temporarely is, and the time zone wherein the routing takes pace.

This is provided by calculation of the difference in time between the time zones, and by calculation of the current subscriber time by adding the time difference to the current time where routing takes place.

Daylight saving time can be taken into account in the time zone obtained from the subscriber and the time zone where routing takes place.

The time zone handling is preferably implemented in a node such as in an SCP (Service Control Point).

The time dependent routing can comprise personal time tables with several periods of time, and wherein several terminals or functions are defined according to any order of priority for each period of time.

One advantage with the invention is that the subscriber always can specify the time table using local time independent of where he is for the moment.

BRIEF OF THE DRAWINGS

The invention is further described here below with reference to the annexed drawings.

DETAILED DESCRIPTION

Personal mobility comprises a multitude of services for a telecommunication user. A personal mobility subscriber, particularly a UPT-subscriber, has for one thing a personal address or a personal number PN which can be used for the entire lifetime of the subscriber independent of operator and such.

Figure 1:
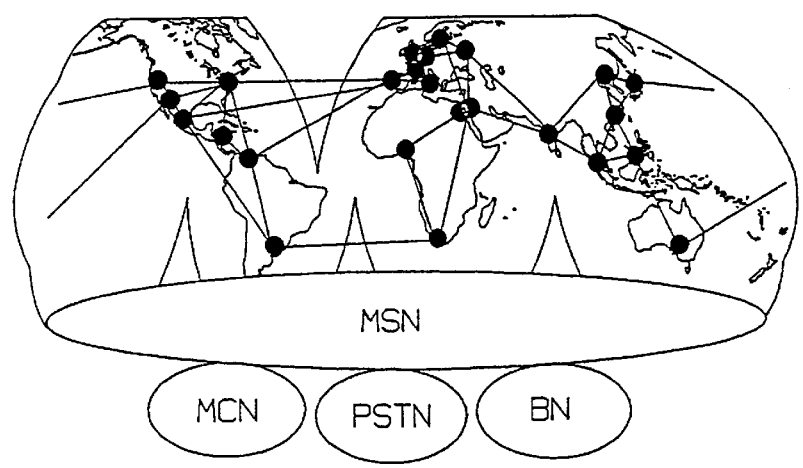
FIG. 1 shows a typical network structure for personal mobility according to prior art.

FIG. 1 shows a network scenario for personal mobility. A network MSN for personal mobility is built with intelligent network technology (IN-technology) in central nodes, i.e. service nodes, for example SCP. The black dots in FIG. 1 could symbolize such nodes. The user of personal mobility can then use any terminal to call or receive incoming calls independent of which type of telecommunication network or type of terminal said user has access to at the moment. The network can, for example, be a stationary public network, PSTN, a corporate network BN or a mobile cellular network MCN. The terminal can, for example, be a telephone, a facsimile machine or a computer.

If a subscriber A whishes to call a subscriber B, who is a personal mobility subscriber, he can call the personal number instead of calling the terminal where he thinks subscriber B is at the moment. Subscriber B decides to which terminal or function, e.g. central message service or barring, the incoming call for the personal number PN is to be routed at every given time. It can be possible to use the number for all types of traffic.

UPT is a concept with personal mobility that has been defined in standardisation processes since 1989/90. Each UPT-subscriber has access to accessible services by an ordinary DTMF telephone (Dual Tone Multi Frequency), a DTMF-transmitter or via Internet. The UPT-subscriber is supported by a number of functions enabling storing of messages and routing incoming traffic to several alternative numbers according to a personal UPT time table.

Figures 2A, 2B:
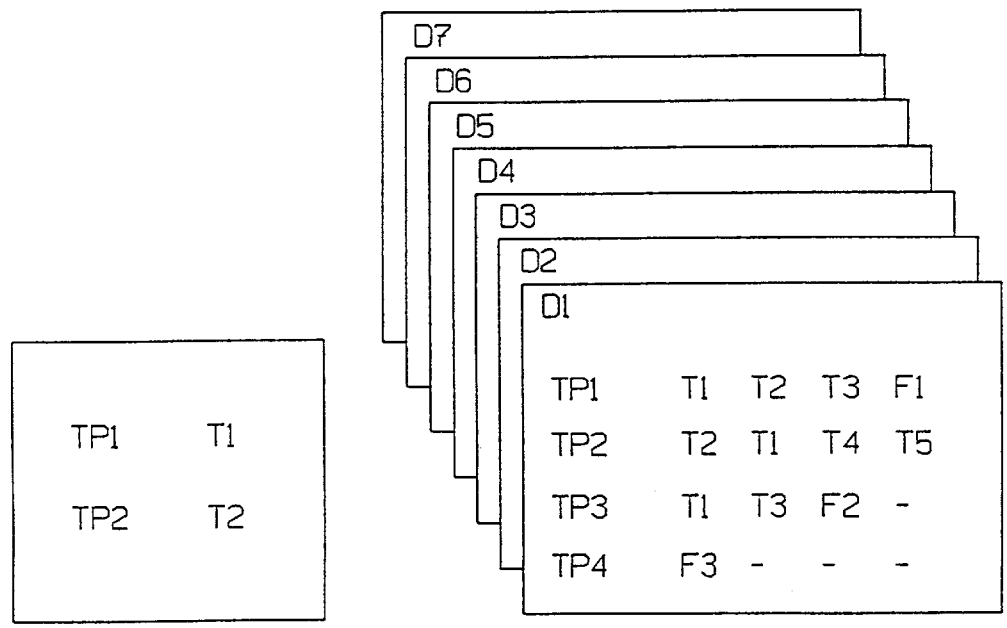
FIGS. 2a and 2b show different types of time tables for flexible routines according to prior art.

Routing of incoming calls depending on the personal UPT time table is a service defined by ETSI as 'Variable Routing Supplementary Service'. Examples of time tables are shown in FIGS. 2a and 2b. In the most simple type of time table two time periods TP1 and TP2 are specified, see FIG. 2a. For each time period TP1, TP2 a terminal number T1, T2 is defined to which incoming traffic is routed. The time table can for example be a daytime table or a weektime table. FIG. 2b shows the time table that ETSI has standardized. It comprises 1–7 daily time tables, D1, D2, . . . , D7. Each day is devided in a maximum of four different time periods, TP1, . . . , TP4. For each time period, TP1, . . . , TP4, up to four different alternative destination addresses T1, T2, T3, F1 can be defined in a priority list. If no answer is received within a time predetermined by the UPT subscriber, normally about 15 seconds, a call is rerouted to the next destination address in the priority list. The call can also be rerouted under other circumstances, e.g. if the first priority terminal is engaged.

The destination addresses of FIG. 2b are merely an example: T1, . . . , T5 define addresses, e.g. numbers, for five different terminals such as, for example, telephones, facsimile machines or computers. F1, . . . , F3 define functions, especially services such as for example, voice mail or barring incoming calls.

An operator providing UPT services can have customers belonging to different time zones. This can be relevant in countries divided in different time zones such as Australia or when the operator offers UPT services for customers temporarily or permanently being in foreign countries. The location of the service node where the service is executed is a vital point, since the service node in itself is only aware of current time in one time zone, that is in the time zone where the service node is.

This causes the time dependent routing to be wrong for all subscribers who are in another time zone than the one in which the service node is.

Consequently the time dependent functionality has to be adjusted to the subscriber time zone every time it is being used. In many time zones there are further rules for daylight saving time. This means that dynamic time zone handling routines have to be introduced.

Figure 3:
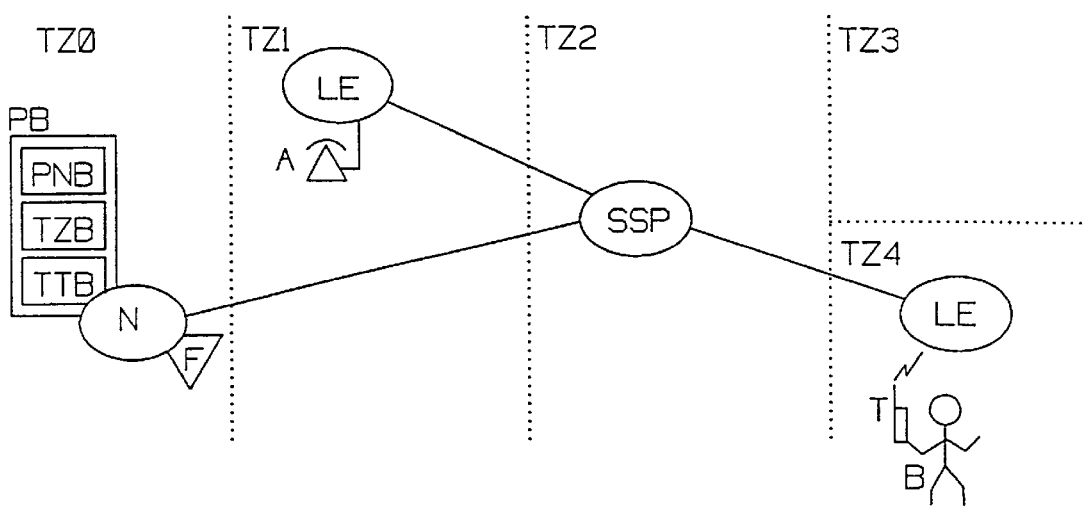
FIG. 3 shows handling of time zones in a telecommunication system according to the invention.

These routines will in the following be further described in connection to the embodiment shown in FIG. 3 of the present invention implemented in a UPT system. Note, however, that the time zone handling according to the invention is not limited to a UPT system but can be used in an arbitrary telecommunication system with time dependent services and which serves customers in more than one time zone.

A subscriber A intends to make a call to subscriber B. He dials a UPT number PNB whereby the service node N is contacted, which is usually made via a local exchange LE and a Service Switching Point, SSP. If the B subscriber subscribes to the time handling service, there is a user profile PB for the subscriber B in the service node N, comprising the subscribers personal time table TTB and a time zone TZB, which the subscriber B has defined. The time zone handling works, according to the invention, in the following way:

1. Calculate the difference in time $\Delta t$ between the time zone TZB provided by the subscriber B and the time zone TZ0, where the service node is: $\Delta t = TZB - TZ0$. Note that the time zone TZB is normally equal to the time zone TZ4, that is the time zone where subscriber B is temporarily or permanently located. Daylight saving time correction can take place if information concerning this is in or is provided to the telecommunication system.

2. Calculate current subscriber time tB by adding the time difference $\Delta t$ to the current node time t0: $tB = t0 + \Delta t$.

3. Compare current subscriber time tB with the subscriber time table TTB, see FIG. 2. Determine how the incoming call is to be rerouted, e.g. to which terminal T, usually via at least one exchange LE, or to which function F. The terminal T can, for example, be a telephone, a facsimile machine or a computer. The function F can be barring or voicemail.

For example, the following time dependent barring functions can be implemented:

Black list for incoming UPT call during a 24 hour period.

Black list for incoming UPT call during a part of a 24 hour period.

Black list for outgoing UPT call during a 24 hour period.

Black list for outgoing UPT call during a part of a 24 hour period.

The black list defines subscribers A, subscriber numbers PNA or terminal numbers which are not allowed contact with subscriber B.

An example illustrating the invention follows below, in reference to FIG. 3.

A subscriber B is a subscriber to a time zone handling service in a UPT system according to the invention. He is, for instance he lives, in a time zone which is normally three hours ahead of the time zone TZ0 where the SCP is located. In March daylight saving time is introduced where the subscriber is, whereby the time difference becomes four hours. The subscriber time zone is denoted TZ4. The user profile PB determined by the subscriber B is:

UPT number: PNB. Time zone TZB=TZ4. Time table: Monday: 07.00 mobile, 08.00 office phone, other alternatives mobile, 17.00 mobile, 18.00 home phone. Tuesday: 00.00 incoming calls barred, 18.00 home phone.

An incoming UPT call is received in the SCP on a Monday in March at 21.00 local time. The call is for the subscriber mentioned above. The SCP then calculates the current time of the subscriber as follows:

1. The difference in time $\Delta t$ between the time zone TZB provided from the subscriber B and the time zone TZ0 where the service node is: $\Delta t = TZB - TZ0 = 4$ hours.

2. The current time tB of the subscriber is calculated: $tB = t0 + \Delta t = $ Monday 21.00+4 hours=Tuesday 01.00.

3. The subscriber current time tB=Tuesday 01.00 is compared to the subscriber Tuesday time table. For the time 01.00 it is stated that all incoming calls are to be barred.

Consequently the incoming call is barred. The location of the service switching point SSP is, of course, irrelevant for the time zone handling and so is the location of the calling party.

Note that the present invention is not limited to a telecommunication system with personal mobility. Time zone handling can be used in all systems with time dependent routing and with, at least, one subscriber in a time zone different from that where routing is done. An example of such a network is a corporate network, e.g. a Virtual Private Network VPN covering at least two time zones.

The present invention corrects for errors which can occur in a telecommunication system with time dependent routing when a subscriber is in another time zone than that where the time dependent routing is executed.

By using the invention a subscriber can always define his personal time table in local time independent of which time zone he is in.

In the following two functions will be further described in connection with said UPT system. The functions are, however, possible to implement in an arbitrary telecommunication system.

Occupied User Call Handling

Problems to be solved: To establish at least some form of information exchange between a calling party A and called subscriber B when the call connection between them has failed. The failure can be caused by an engaged line or no answer being received.

Solution: A telecommunication system, particularly a node therein, is arranged for routing the calling party A to a menu specified by the called subscriber B in the event of the connection between parts A, B failing, which menu provides routing to at least one alternative terminal T or function F. The terminal can, for example, be a mobile phone, a computer or a facsimile machine. The function can, for instance, be queing for continuous connection trials, automatic recall or connection to a message center.

Advantages: The function means that information exchange nearly always can be established. By specifying the menu the called party B can decide what types of information transfer the part A is referred to, particularly what terminals or functions the part A can choose to be routed to. By menu choices the part A can decide what suits him best. The menu function provides a very flexible solution to the problem. The number of failed connections can, in this way, be reduced very near to zero.

A functional description of handling failed connection follows below. Suppose the above mentioned handling is implemented in a telecommunication system based on Intelligent Networks IN, particularly in a network of UPT type. Suppose further that the called subscriber B is a subscriber to the network. The handling can then be activated by the UPT subscriber B at any time. It is independent of other services in the network. The handling queues every incoming call for the UPT subscriber B preferably in a strict FIFO (First In First Out) order. If the handling is active an incoming call from the calling party A must pass the queue handling. If the UPT subscriber B is free, the call is connected or alternatively the calling party is referred to some type of registration. If the UPT subscriber B is engaged in another incoming or outgoing call, the party A is routed to a menu where he can choose one of the following alternatives.

Menu:

1. Wait for the UPT user to be free; queuing system.

2. To be automatically called back from a queue, for instance, an ACB type queue (Automatic Call Back), when the UPT subscriber B becomes available.

3. To be called back at the subscriber's B convenience, i.e. CB (Call Back); see further separate description of this function.

4. To be connected to a central message service.

In the first case above the calling party A waits for a predetermined period of time for the called party B to become available. The maximum waiting time in the queue can be defined by the UPT subscriber B. The waiting time could also be dependent on how the billing is executed. If the waiting time expires without the call being connected, the calling party is again confronted with menu. He can thus choose a new alternative or hang up.

In a second case the UPT network needs knowledge of the destination address for the ACB call, that is the calling party's address or number PNA. The UPT network can be defined for automatic registration of the calling party's address, but the calling party A can also be requested to input his address or a desired ACB number. The UPT network can e.g. analyse the calling party's address PNA to determine whether the address originates from a corporate exchange or a foreign country. If conditions are so, the calling party A must input a desired ACB number since the UPT network does not have knowledge of the calling party's address PNA. When this has occurred, the calling party A is requested to hang up.

When the called party B becomes free, the UPT network will try to establish an ACB call by using the stored subscriber address. One or several trials of ACB will be made, which can be specified by the UPT subscriber B. The calling party A is called, whereby he lifts the receiver. The UPT network will now set up the call to the called party. Alternatively, the network can give a message to the calling party A concerning the UPT subscriber B being free. Since the UPT subscriber B is likely to be billed for the entire ACB call it is for him to decide, which process will occur.

In the third case too, the network must have knowledge of the calling party's subscriber address. This can be done as described above. The third case will also be mentioned below in connection with the next functional description.

In the fourth case above, the call is connected to a central message service, e.g. voice message, facsimile mail, E-mail type or such.

Note that the calling party A can be confronted with the menu in other cases than when the line is busy too. Examples of such situations can be when no answer is received, when the network or part of it is overloaded, if the calling party A is barred, that is his address PNA is not on the called party's 'white list' defining addresses from which incoming calls are allowed. If the UPT subscriber demands a PIN-code (Personal Identification Number) for incoming calls and the calling party does not dial this, routing to the menu can occur. In principle, all situations for which a connection of the call between the parties A, B fails, can lead to the party A being confronted with the menu.

The menu could also comprise more alternatives than the one's described above, or other alternatives instead of the one's described above. Examples of such alternatives are as follows.

Routing to a facsimile terminal
Routing to a video terminal
Routing to a computer terminal
Routing to a mobile phone
Signalling in a possible current call, the subscriber B having the possibility of alternating recalls
Interruption of a possible current call
The menu can comprise any function F or routing to any terminal T.

No Contact-Call Return Menu

Problem to be solved: A called party B is not aware that a calling party A has tried to have a call connected between them and wishes to be recalled by the called party B at a later time.

Solution: The telecommunication system, particularly a node therein, is arranged to, in the event that connection between the parties A, B fails and the calling subscriber A wishes to be called by the called subscriber B, store the calling subscriber's subscriber address PNA and inform the called subscriber B that the calling party A wishes to be called. Subscriber addresses are preferably stored for different incoming subscribers in a list that is automatically exposed to the called party B when he joins the system, whereby there is a possibility for each stored address to connect a call or take it off the list. There may also be a control for purging the entire list.

Advantages: The function enables the called party to be informed of what calling subscribers wish to be recalled after a failed trial of connection. By using the list of subscriber addresses the called party B can decide which subscribers he wishes to call. This function provides a very flexible solution to the problem.

A functional description of the handling of call back follows below. This handling presents, to a subscriber B, the menu of calling subscribers having failed in their trials to communicate with subscriber B and who wish to be called by subscriber B when he so wishes. These subscribers may have choosen this alternative at step 3 in the menu described above.

This function is preferably implemented in such a way that information about the list is given automatically to the called party B when he logs on to the system. If there are no numbers in the list this information is presented, whereby the subscriber B is led to the system main menu. If there are numbers in the list the subscriber B is directed straight to the list and its first number, whereby there is a choice of possibilities to either set up a call or cancel the number from the list. After the call/cancellation of the number, the next number of the list is presented, the choice of possibilities described above being presented again. When all the numbers on the list have been treated the UPT user is redirected to the main menu. There may also be a choice of possibilities to cancel the entire list straight away or to go directly to the main menu and keep on having the numbers on the list stored.

Note that in the functions described above references are made to a calling party A and a called party or subscriber B. Only the called party B has to be a subscriber in a network with the functions described. The parties' terminals can be of any kind, such as, for example, telephones, mobile phones, facsimile machines or computers. Call set up comprises set up of terminals for communication exchange of any type, e.g. speech, text, data and video.

The invention is naturally not limited to the above described and on the drawings shown embodiments, but can be modified within the scope of the annexed claims.

What is claimed is:

1. A method for time zone handling in a telecommunication system with time dependent routing, the system comprising a time table for a subscriber including at least two time periods defined in the time zone of a service node, where at least one terminal or function is defined for each time period, the method comprising calculating a time difference between a time zone obtained from the subscriber and the time zone of the service node, calculating a corrected current time for an incoming call to the subscriber by adding the time difference to the current time for the incoming call in the time zone of the service node, and comparing the corrected current time for the incoming call with the time table to determine to which terminal or function the call is to be routed.

2. A time zone handling method of claim 1, wherein the telecommunication system has personal mobility and is a Universal Personal Telecommunication type system, and the time zone obtained from the subscriber is the time zone where the subscriber is permanently or temporarily located.

3. A time zone handling method according to claim 1, wherein daylight saving time is taken into consideration both in the time zone obtained from the subscriber and the time zone of the service node.

4. A time zone handling method according to claim 1, wherein the method is executed in a service control point.

5. A service node in a telecommunication system with time dependent routing, the system comprising a time table for a subscriber including at least two time periods defined in the time zone of a service node, where at least one terminal or function is defined for each time period, the service node comprising means for calculating a time difference between a time zone obtained from the subscriber and the time zone of the service node;

calculating a corrected current time for an incoming call to the subscriber by adding the time difference to the current time for the incoming call in the time zone for the service node, and comparing the corrected current time for the incoming call with the time table to determine to which terminal or function the call is to be routed.

6. A service node according to 5, wherein the telecommunication system has personal mobility and is a Universal Personal Telecommunication type system, and the time zone obtained from the subscriber is the time zone where the subscriber is permanently or temporarily located.

7. A service node according to claim 5, wherein it is adapted to take daylight saving time into consideration both in the time zone obtained from the subscriber and in its own time zone.

8. A service node according to claim 5, wherein it is a service control point.

9. A service node according to claim 5, wherein several terminals or functions are defined in the time table in any order of priority for each time period.

10. A telecommunication system with time dependent routing, comprising a time table for a subscriber including at least two time periods defined in the time zone of a service node, at least one terminal or function is defined for each timer period the system comprising means for calculating a time difference between a time zone obtained from the subscriber and the time zone of the service node, calculating a corrected current time for an incoming call to the subscriber by adding the time difference to the current time for the incoming call in the time zone of the service node, and comparing the corrected current time for the incoming call with the time table to determine to which terminal or function the call is to be routed.

11. A telecommunication system according to claim 10, wherein the telecommunication system has personal mobility and is a Universal Personal Telecommunication type system, and the time zone obtained from the subscriber is the time zone where the subscriber is permanently or temporarily located.

12. A telecommunication system according to claim 10, further comprising, means for taking daylight saving time into consideration both in the time zone obtained from the subscriber and the time zone of the service node.

13. A telecommunication system according to claim 10, wherein the service node comprises a service control point.

14. A telecommunication system according to claim 10, wherein several terminals or functions are defined in the time table in any order of priority for each time period.

* * * * *